Jan. 26, 1943. W. A. WISSLER 2,309,372
CUTTING TOOL
Filed June 11, 1940
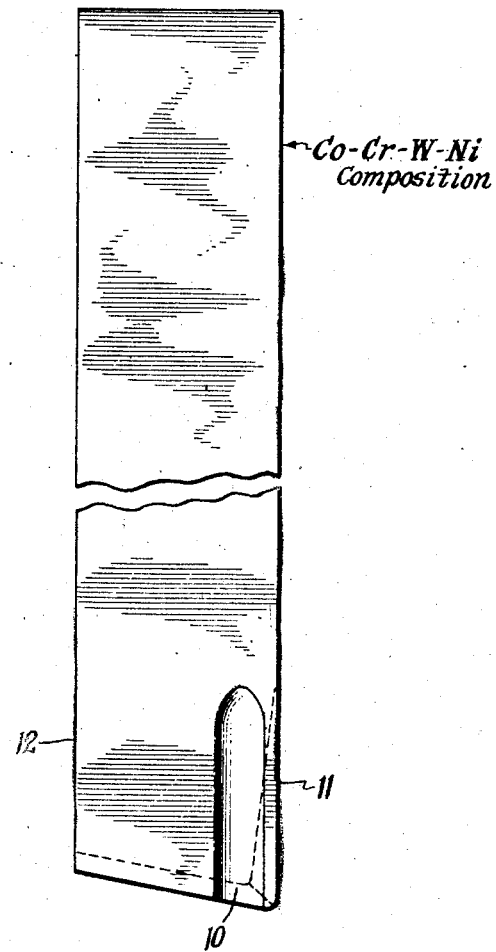
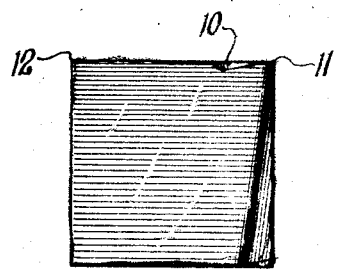
INVENTOR
WILLIAM A. WISSLER Patented Jan. 26, 1943

2,309,372

UNITED STATES PATENT OFFICE 2,309,372

CUTTING TOOL

William A. Wissler, Niagara Falls, N. Y., assignor to Haynes Stellite Company, a corporation of Indiana Application June 11, 1940, Serial No. 339,856

2 Claims. (Cl. 29—95)

The invention relates to edged cutting tools for cutting steels.

The special steels known as high speed steels are widely used as tools for cutting materials of many kinds, including cast iron and semi-steel, steel, nonferrous metals, and nonmetallic materials. The demand for materially greater cutting speeds than can be used practically with high speed steel tools has led to the widespread use of the "Stellite" type of tools, composed principally of chromium, tungsten-molybdenum group metal (tungsten or molybdenum or both), carbon, and cobalt, frequently modified by the addition of minor percentages of vanadium or boron or both.

"Stellite" tools have been known since the original work of Elwood Haynes on the subject, over 25 years ago. A considerable amount of research has since been done on various modifications of the original "Stellite" compositions, as evidenced by the large number of patents in this field. The more successful researches have led to the commercial adoption from time to time of numerous compositions, advocated either for general use or for some special application.

"Stellite" tools have been commercially successful in practically all important uses except one: the machining (turning, milling, hobbing, etc.) of steel under non-rigid "springy" conditions which permit a substantial yielding between the tool and the work. Such conditions are found, for instance, in the turning of slender shafts which tend to spring away from the nose of the tool, and also in numerous automatic and semi-automatic cutting machines which hold the tool non-rigidly and which may permit the nose of the tool to spring away from the work. Such behavior leads to a rapid loss of depth of cut, to uneven cutting or chattering of the tool; and to the chipping and dulling of the tool which, in turn, leads rapidly to loss of cutting ability. Cobalt-chromium-tungsten types of tools have not been generally satisfactory under such conditions, and the slower-cutting high speed steels have been used almost exclusively for this kind of work. It appears likely that the shortcoming of the cobalt-chromium-tungsten tools in this respect is connected with their inability to maintain under non-rigid conditions a thin or sharp cutting edge.

An object of this invention is to provide a means for cutting steel successfully, at speeds higher than can be used practically with high speed steels, without rapid loss of depth of cut or rapid failure of the tool, under non-rigid "springy" conditions which cause ordinary "Stellite" tools to lose depth of cut rapidly.

Another object is to provide a cobalt-chromium-tungsten base, edged cutting tool adapted to cut steel at high speeds under the non-rigid conditions just described.

A further object is to provide a cobalt-chromium-tungsten base, edged cutting tool having self-sharpening characteristics, i. e. which under many conditions of cutting forms and maintains a sharp cutting edge as it wears during use as a tool.

The objects of the invention are attained through the application of my discovery that certain tools within a range of compositions heretofore believed to be inferior, and which are indeed inferior to ordinary "Stellite" both in conventional testing procedures and in use for cutting cast iron, semi-steel, and steel under many rigid conditions, are surprisingly superior to commercial kinds of "Stellite" when used for cutting steel under non-rigid conditions.

More specifically, I have found that the presence of 5% to 15% of iron in a cobalt-chromium-tungsten type of tool adapts such tool for cutting steel under non-rigid conditions and imparts thereto self-sharpening characteristics.

The tool of the invention essentially comprises cobalt, chromium, tungsten-molybdenum group metal, and iron. Preferably, it also contains boron and vanadium. The composition limits both ultimate and preferred, are set forth below, in tabular form for convenience.

|  | Broad range | Preferred range |
|---|---|---|
| Percent chromium | 15 to 40 | 20 to 35 |
| Percent tungsten-molybdenum | 8 to 25 | 10 to 20 |
| Percent iron | 4 to 15 | 6 to 10 |
| Percent carbon | 0.5 to 3 | 1 to 2.5 |
| Percent boron | 0 to 0.5 | 0.02 to 0.15 |
| Percent vanadium | 0 to 8 | 1 to 4 |
| Percent cobalt | Remainder | Remainder |

Although either tungsten or molybdenum, or both, may be used, tungsten is ordinarily preferred. A small percentage of nickel may be present; but if both iron and nickel are used, the sum of the percentages of iron and nickel ought to be at least 7% for best results.

Numerous cutting tools have been made in accordance with this invention and tested under both laboratory conditions and commercial conditions. In these tests the superiority of the tools of the invention has been established.

For example, a series of tools having the approximate compositions indicated in Table A was tested on actual commercial production work of several different kinds in different machine shops, with the results reported in Table B.

Table A

| Tool type | Composition, approximate percent | | | | | | |
|---|---|---|---|---|---|---|---|
| | Cr | W | V | Fe | C | B | Co |
| A | 30 | 15 | 2 | 7 | 2.2 | 0.17 | Rest. |
| S | 32 | 16 | 0 | 2.5 | 2.3 | 0.14 | Do. |
| H | (High speed steel of 18% W—4% Cr—1% V type) | | | | | | |

Tool A is a typical tool embodying the invention, tool S is a standard "Stellite" type of tool, and tool H is a standard high speed steel tool of good quality.

Table B

| Test No. | Brinell No. of work | Depth of cut, inch | Feed, inch | Surface speed ft./min. | Tool type | Pieces per grind | Conditions |
|---|---|---|---|---|---|---|---|
| 1 | 275 | 3/8 | 0.027 | 90 | A | 1 | Springy |
| | 275 | 3/4 | 0.027 | 30 | H | 1/3 to 1/2 | Do. |
| 2 | 230 | 1/8 | 0.025 | 200 | A | 100 | Do. |
| | 230 | 1/8 | 0.025 | 200 | S | 70 | Do. |
| | 230 | 1/8 | 0.025 | 200 | H | 0 | Do. |

In test 1, the workpieces were shafts four inches in diameter, non-rigidly supported. In test 2, the workpieces were roller-bearing races four and three-quarters inches in diameter non-rigidly supported and with scaly surfaces having high and low spots which tended to make the tool ride the surface of the workpiece.

Although most of the standard shapes or "grinds" of steel-cutting tools may suitably be used, for many purposes I prefer that shown in the accompanying drawing, wherein:

Fig. 1 is a plan view of a cutting tool, and

Fig. 2 is an elevation of the tool shown in Fig. 1.

When the shape illustrated is used, the tools of this invention tend to wear in such a way as to maintain a relatively sharp cutting edge, i. e. they are self-sharpening. As shown, the tool has a chip-guiding groove 10 in the horizontal face 12 adjacent the cutting edge 11; the side relief angle is about 8°; the nose angle is about 80°; and the end relief angle is about 10°. The width of the groove 10 is ordinarily in the neighborhood of one-quarter of an inch, and the angle between the face 12 and the bottom of the groove 10 is about 10°.

I claim:

1. A cutting tool comprising 15% to 40% chromium, 8% to 25% tungsten-molybdenum group metal, 0.5% to 3% carbon, 1% to 8% vanadium, 6% to 15% iron, remainder cobalt.

2. A steel-cutting edged tool comprising cobalt, chromium, tungsten, vanadium, carbon, and boron, which elements impart the properties of hardness and wear resistance which are maintained at a red heat, and iron which imparts the property of self-sharpening during use of the tool and improves the ability of the tool to cut steel under non-rigid conditions at high speeds although deleteriously affecting its ability to cut cast iron, the composition of said tool being within the limits of 20% to 35% chromium, 10% to 20% tungsten, 1% to 4% vanadium, 1% to 2.5% carbon, 0.02% to 0.5% boron, 6% to 10% iron, remainder cobalt.

WILLIAM A. WISSLER.